US011216417B2

(12) United States Patent
Garaga et al.

(10) Patent No.: US 11,216,417 B2
(45) Date of Patent: Jan. 4, 2022

(54) SYSTEMS AND METHODS FOR SCALING BEYOND MAXIMUM NUMBER OF UNIQUE OBJECT IDENTIFIERS IN SINGLE CONTENT REPOSITORY

(71) Applicant: Open Text Holdings, Inc., San Mateo, CA (US)

(72) Inventors: Pulla Rayudu Garaga, Bengaluru (IN); Satya Sai Chaitanya Patchigolla, Bengaluru (IN)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 0 days.

(21) Appl. No.: 16/707,314

(22) Filed: Dec. 9, 2019

(65) Prior Publication Data

US 2021/0173812 A1 Jun. 10, 2021

(51) Int. Cl.
| | |
|---|---|
| G06F 12/00 | (2006.01) |
| G06F 16/00 | (2019.01) |
| G06F 16/13 | (2019.01) |
| G06F 16/22 | (2019.01) |
| G06F 16/182 | (2019.01) |
| G06F 16/172 | (2019.01) |
| G06F 16/23 | (2019.01) |

(52) U.S. Cl.
CPC ............ *G06F 16/13* (2019.01); *G06F 16/172* (2019.01); *G06F 16/183* (2019.01); *G06F 16/2282* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 9,268,806 B1* | 2/2016 | Kesselman | G06F 16/2255 |
| 2009/0320141 A1* | 12/2009 | Wang | G06F 21/6218 726/27 |
| 2014/0331086 A1* | 11/2014 | Resch | G06F 11/1458 714/15 |
| 2015/0134711 A1* | 5/2015 | Srinivas | G06F 16/134 707/828 |
| 2018/0218031 A1* | 8/2018 | Wong | G06F 16/2425 |

* cited by examiner

*Primary Examiner* — Tuan A Pham
(74) *Attorney, Agent, or Firm* — Sprinkle IP Law Group (57) ABSTRACT

Disclosed is a new identifier allocation approach for allocating repository object identifiers beyond a maximum number usually allowed for a single repository. The new identifier allocation approach includes an enhanced identifier structure in which a portion usually reserved for a docbase identifier is modified to combine with a partition identifier. The actual docbase identifier is stored in a server configuration file. When the maximum number of object identifiers has been allocated, a new partition is created and a sequence table is updated with a new entry that reflects the new partition. A new repository object identifier is allocated using the docbase identifier combined with the new partition identifier. In this way, more than 4 billion objects per object type can be addressed uniquely within a docbase by creating new partitions. This new approach is very unique and flexible in accommodating both on premises and multi-tenant environments.

16 Claims, 4 Drawing Sheets

SYSTEMS AND METHODS FOR SCALING BEYOND MAXIMUM NUMBER OF UNIQUE OBJECT IDENTIFIERS IN SINGLE CONTENT REPOSITORY

TECHNICAL FIELD

This disclosure relates generally to the field of content management. More particularly, this disclosure relates to systems, methods, and computer program products for scaling beyond the maximum number of unique repository object identifiers previously allowed in a single content repository.

BACKGROUND OF THE RELATED ART

A content repository can be considered a low-level, application-independent data store for storing enterprise assets such as digital content and associated metadata. The digital content can be stored as content files. The associated metadata (e.g., attributes that describe the content files) can be stored in attribute tables in a relational database management system (RDBMS). In addition to the content files and the attribute tables, the content repository can include full-text indexes for content-based searching of the digital content stored in the content repository. When a document is added to the content repository, its associated content files are added to the storage area's index the next time the index is updated.

To keep track of documents indexed and stored in a content repository, various types of identifiers could be used. These can include identifiers for databases, tables, program files, indexes, etc. The maximum length of characters of an identifier can vary by repository type as well as identifier type (e.g., 16, 64, 256 characters). This maximum character length defines the maximum number of identifiers that a repository can generate and use to identify objects stored therein. For example, a repository that uses a 16-bit hexadecimal representation for its object identifiers means that it can, at most, store about four billion objects (i.e., 4,294, 967,295 objects). Currently, it is not possible to scale beyond the maximum number of unique object identifiers allowed in a repository that employs such a 16-bit hexadecimal representation.

SUMMARY OF THE DISCLOSURE

An object of the invention is to provide an enterprise content management (ECM) platform with the ability to scale beyond the maximum number of unique repository object identifiers previously allowed in a single content repository operating on the ECM platform. In some embodiments, this object can be achieved in a new approach of generating/allocating repository object identifiers using partition to support the ECM platform. The new approach allows for generation/allocation of a huge number of repository object identifiers beyond the maximum number of unique repository object identifiers previously allowed and can also improve the performance of the ECM platform in a distributed environment such as a service-oriented architecture.

The uniqueness of the approach includes: adding tenant information in unique repository object identifiers to identify tenant objects in a repository; providing intelligence in identifying tenant-specific objects based on repository object identifiers; performing optimization using repository object identifiers; improving performance while generating repository object identifiers at the content server level.

Some ECM repositories may store objects using a 16-bit hexadecimal representation to uniquely identify the stored objects. This 16-bit hexadecimal representation has a structure that infers three parts: an object type tag, a docbase identifier, and a unique object identifier. This identifier structure means that a repository can, at most, store a maximum of 4,294,967,295 objects (0xFFFFFFFF) of the same type in the repository.

Generally, a repository for an ECM platform involves three primary elements: a content server, a relational database, and a place to store files (e.g., a persistent store). Everything in a repository is stored as an object. The content file associated with an object is typically stored in a file system. An object has associated metadata (e.g., a file name, storage location, creation date, etc.). The metadata for each object is stored as a record in a relational database. A secure ECM repository is referred to herein as a "docbase."

In some embodiments, a new object identifier generation method can include: determining, by a content server, whether a maximum number of repository object identifiers has been issued or otherwise allocated for storing objects for a tenant in a docbase operating in a multi-tenant environment. In some embodiments, each object identifier has a 16-bit hexadecimal representation having an identifier structure that infers an object type tag, the docbase identifier, and a unique object identifier. In some embodiments, the maximum number of repository object identifiers that can be allocated by the docbase is 4,294,967,295.

In some embodiments, the determination as to whether a maximum number of repository object identifiers has been issued or otherwise allocated can be made by the content server when the content server allocates a set of repository object identifiers from the docbase or when the content server receives a request for a chunk of repository object identifiers. In some embodiments, the request is received from an object-relational-mapper for a tenant communicatively connected to the content server. In some embodiments, the request specifies an object type.

The docbase has its own docbase identifier. Responsive to a determination that the maximum number of repository object identifiers has been issued or otherwise allocated, the content server stores the actual docbase identifier in a server configuration file and creates a modified docbase identifier by adding a new partition identifier to the actual docbase identifier. In some embodiments, this modification only involves a very small portion of the second part of the identifier structure (e.g., using one or two of the 6-bit hexadecimal representation for the docbase identifier).

In some embodiments, the modified docbase identifier is used to allocate new repository object identifiers for identifying objects of the same object type. In some embodiments, the allocated new repository object identifiers can be stored in a server cache of the content server. In some embodiments, the new partition identifier is stored, separately from the actual docbase identifier, in a table to keep track of any partitions created for each object type.

In some embodiments, the table can be a sequence table in the docbase. In some embodiments, the sequence table stores attributes used by a sequence generator to generate and assign repository object identifiers. In some embodiments, the attributes include a current value of allocated identifiers, a low watermark below which is not possible to allocate identifiers, and a high watermark beyond which is not possible to allocate identifiers.

The invention provides many advantages, including directly supporting multi-tenant environments without requiring any major changes to existing ECM platforms and/or operations. The inventive approach disclosed herein can also be adapted for on-premises environments.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
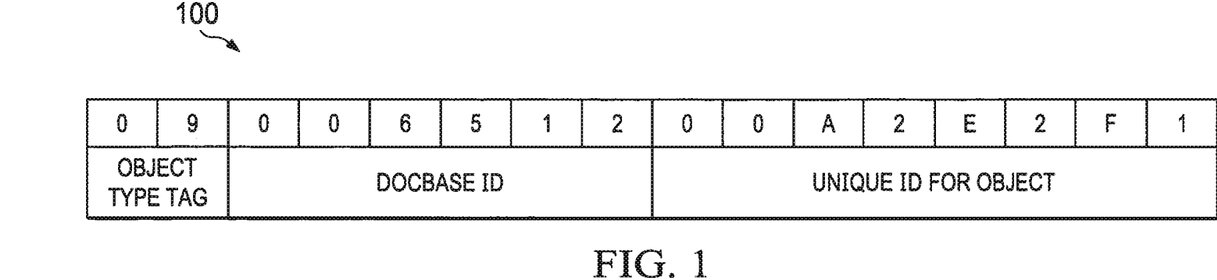
FIG. 1 depicts an example of an identifier structure for storing objects in a docbase.

FIG. 1 depicts an example of an identifier structure 100 for storing objects in a docbase. With identifier structure 100, each repository object identifier (ID) is represented by a 16-bit hexadecimal number that infers three parts: an object type tag, a docbase ID, and a unique object ID. The first two bits (e.g., "09" shown in FIG. 1) is reserved for the object type tag. In one embodiment, all objects in a docbase begin with the same object type tag. After the object type tag, the following six bits (e.g., "006512" shown in FIG. 1) are reserved for the docbase ID. All objects in the same docbase will have the same six bits. The last eight bits (e.g., "00A2E2F1" shown in FIG. 1) are reserved for uniquely identifying each object stored in the docbase. With this approach, identifier structure 100 can be used to allocate 4,294,967,295 unique repository object IDs for storing a maximum of 4,294,967,295 objects (0xFFFFFFFF) of the same object type within a docbase.

Generally, allocation of unique repository object IDs based on identifier structure 100 is as follows. A server allocates IDs from a docbase in chunks which are then handed out one-by-one to callers of the following routine very efficiently (because only the server's memory is updated).

On the first request for each tag—or when a previously allocated chunk of IDs is exhausted—a new chunk of IDs is allocated by updating a docbase sequence generator. This sequence generator is part of the functionality of the docbase and uses information stored in a table (e.g., a sequence table, an attribute table, a property table, a tracking table, etc.) stored in the docbase. The table (which is referred to hereinafter as a sequence table because it is used by the sequence generator) contains various properties or attributes such as masks/watermark values that are used by the sequence generator to generate and assign repository object IDs efficiently.

More specifically, the sequence generator utilizes primarily three important attributes to generate repository object IDs (e.g., "r_object_id"): current value (e.g., "i_last_no"), low watermark (e.g., "i_low_water_mark"), and high watermark (e.g., "i_high_water_mark"). The first attribute stores the current value until IDs are allocated. The second attribute stores the lowest value less than which is not possible to allocate (e.g., −2147483392). The third attributes stores the highest value after which is not possible to allocate (e.g., 2147483646).

All these three values are stored in the docbase for all the tags supported by the docbase. The sequence generator starts allocating IDs for the requested tag starting from the current value (per the first attribute) in chunks of a predetermined size (e.g., 1024 IDs). Once the IDs are allocated for the tag, it is not possible to generate any more IDs for the corresponding tag, thereby limiting the docbase's ability to store more new objects with the requested tag. This allocation process is generally illustrated in FIG. 2.

Figure 2:
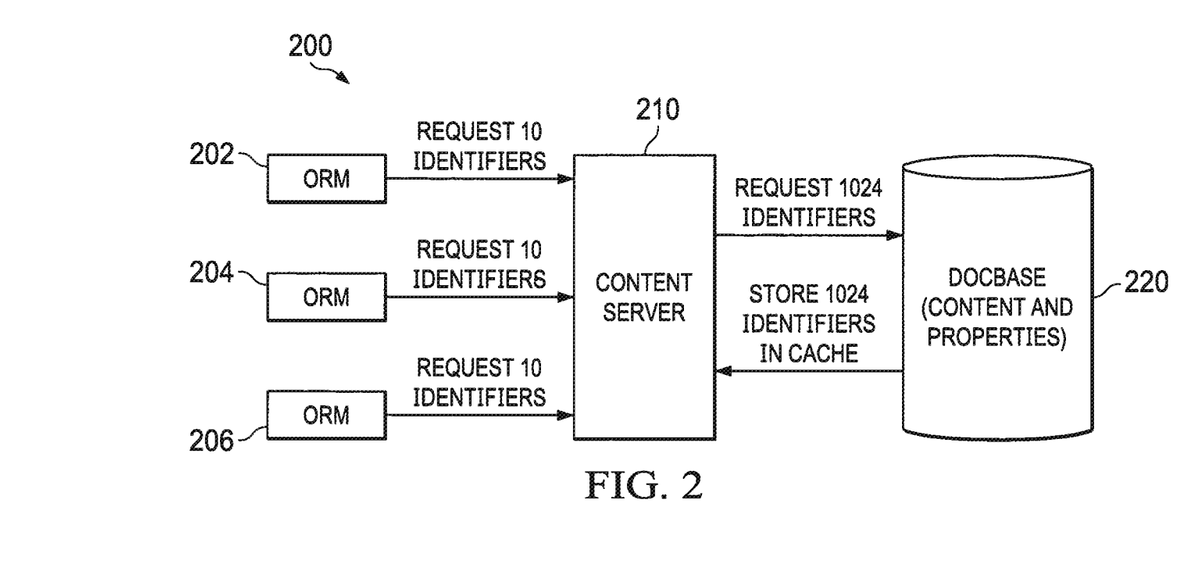
FIG. 2 depicts a diagrammatic representation of an example network computing environment where embodiments of an ECM platform can be implemented.

FIG. 2 depicts a diagrammatic representation of an example network computing environment 200 where embodiments of an ECM platform can be implemented. In this example, the ECM platform has a content server 210 and a docbase 220. Content server 210 is communicatively connected to multiple object-relational-mappers (ORMs) 202, 204, 206. Each ORM can represent a set of Java classes called DOCUMENTUM Foundation Classes (DFC). The Java classes make essentially all the functionality of content server 210 available to client programs through a published set of interfaces. The ORMs are adapted for programmatically accessing and manipulating all of the objects in stored in docbase 220. As a requester, an ORM always requests content server 210 a chunk of a predetermined size of IDs (e.g., 10 IDs). In response, content server 210 allocates 10 IDs from its cache (not shown in FIG. 2). When the IDs in the cache are allocated, content server 210 requests the next set of 1024 IDs from docbase 220 and updates all the necessary fields in the sequence table (e.g., the current value).

Figure 3:
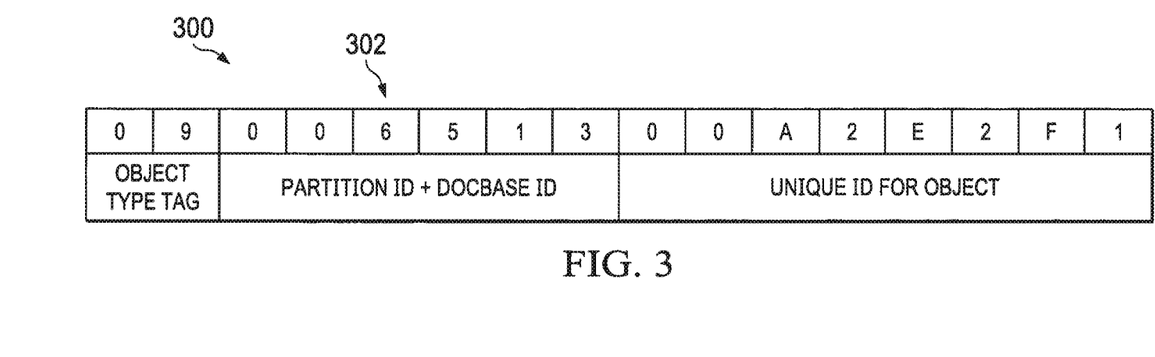
FIG. 3 depicts an example of an enhanced identifier structure for storing objects beyond the maximum in a docbase according to some embodiments of a new identifier allocation approach disclosed herein.

FIG. 3 depicts an example of an enhanced identifier structure 300 for storing objects beyond the maximum in a docbase according to some embodiments. With enhanced identifier structure 300, it is possible to store more than 4 billion objects and allocate a similar 16 bit hexadecimal unique repository object ID after reaching the current maximum threshold.

More specifically, as shown in FIG. 3, the 16-bit representation of enhanced identifier structure 300 is similar to identifier structure 200 shown in FIG. 2 with the exception of the portion usually reserved for a docbase ID. Instead of storing a docbase ID, a second part 302 of enhanced identifier structure 300 stores a combination of a docbase ID and a partition ID of a database which stores object metadata. The actual docbase ID is stored in a server configuration file (e.g., "server.ini"). Thus, given a repository object ID, a corresponding database partition ID for this object can be determined from the actual docbase ID stored in the server configuration file.

For example, according to enhanced identifier structure 300, suppose the actual docbase ID stored in the server configuration file is "006512" and, given the object type tag is "09" and the unique object ID is "00A2E2F1," the corresponding repository object ID when stored in "partition 1" would be "09 006513 00A2E2F1," as shown in FIG. 3.

The sequence table is modified to support this design (i.e., storing the partition ID+docbase ID in second part 302 of enhanced identifier structure 300), leveraging the database list partition technique. If all 0xFFFFFFFF objects of a particular type are created in a docbase, a new database partition could be implicitly created and can store new objects of this type in the same repository. In above example, 0x02 partition will be created once all objects of a particular tag are created in 0x01. A corresponding new row for this tag (e.g., "09" shown in FIG. 3) will be created in the sequence table which indicates that this type stores objects in two partitions. This is further illustrated in FIG. 4.

Figure 4:
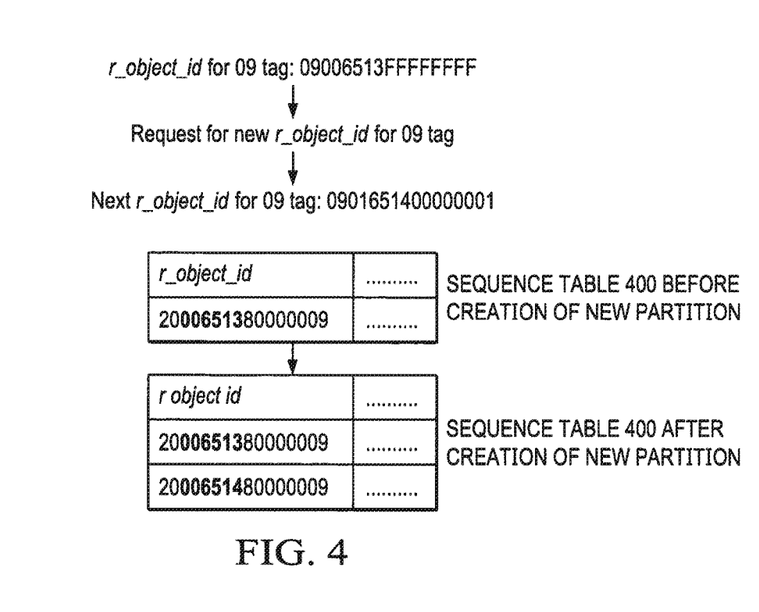
FIG. 4 depicts an example of generating a new unique repository object identifier embedded with a new partition identifier and a corresponding change to a table according to some embodiments.

As shown in FIG. 4, the maximum number (e.g., 0xFFFFFFFF) of objects of a particular object type "09" (per the two-bit tag in the first part of enhanced identifier structure 300) have been created in the same docbase "006513" (per the second part of enhanced identifier structure 300). To service a request for a new repository object ID having the same object type tag, a new partition identifier is combined with the actual docbase ID stored in the server configuration file to generate the next unique repository object ID (i.e., beyond the maximum number of objects). A sequence table 400 is correspondingly updated with a new row.

The database partition ID(s) can be determined from the sequence table by subtracting the docbase ID stored in the server configuration file from the repository object ID. For instance, for the same object type, there are two rows stored in the sequence table and the "09" tag for the object type is stored in two partitions computed as follows:

006513−006512=01

006514−006512=02

The above-described identifier allocation approach also provides a benefit to directly support multi-tenant environments without needing any major changes in design. In a multi-tenant environment, a docbase stores all tenant information like a tenant name (e.g., "tenant_name"), a tenant ID (e.g., "tenant_id"), partition ID for a corresponding tenant (e.g., "i_partition[ ]"), etc. Partition ID is a multi-valued attribute which has list of partition IDs associated with the tenant. Tenant name and tenant ID are projected by a connection broker (e.g., "DocBroker") to ORMs and used in relevant remote procedure calls.

As a non-limiting example, Table 1 below shows tenant subscription information:

| tenant_name | tenant_id | i_partition |
|---|---|---|
| Tenant 1 | 1 | 1 |
| Tenant 2 | 2 | 2 |

For the above example, the sequence table would have two entries for every tag, one for each tenant. Table 2 below shows example entries for the "09" tag:

| r_object_id | ... |
|---|---|
| 2000651380000009 | ... |
| 2000651480000009 | ... |

When a request for a new repository object ID with the "09" tag is received for tenant 1 and the existing partition for tenant 1 is full, a new partition, 3, for this tenant will be created and the tenant subscription information table (Table 1) will be updated accordingly. Additionally, a new row for this tag is created in the sequence table (Table 2). The updated tables are shown below:
Updated Table 1.

| tenant_name | tenant_id | i_partition |
|---|---|---|
| Tenant 1 | 1 | 1, 3 |
| Tenant 2 | 2 | 2 |

Updated Table 2.

| r_object_id | ... |
|---|---|
| 2000651380000009 | ... |
| 2000651480000009 | ... |
| 2000651480000009 | ... |

Figure 5:
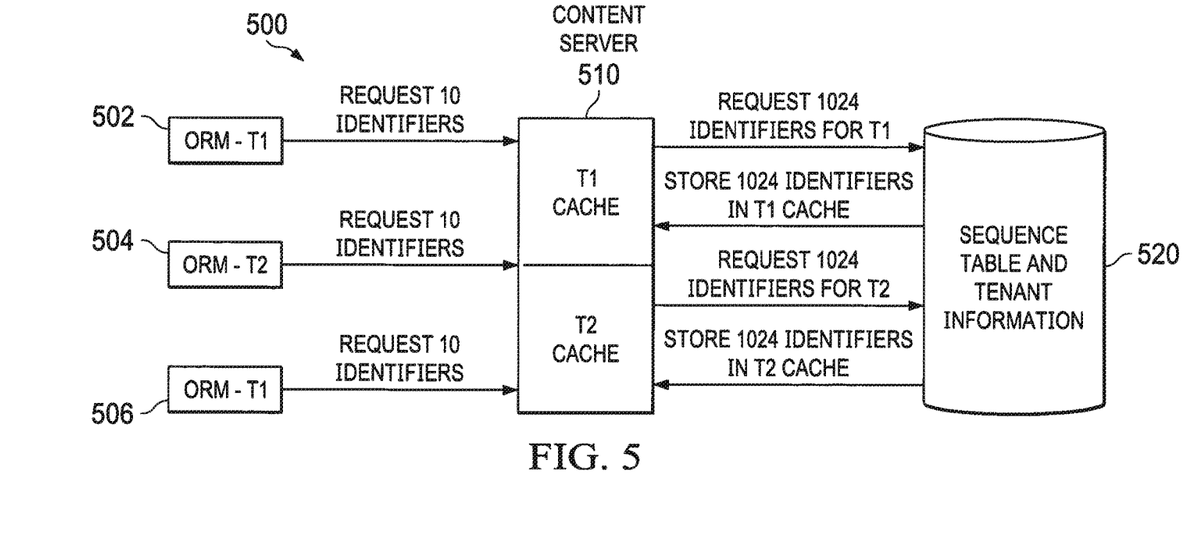
FIG. 5 depicts a diagrammatic representation of an example of a multi-tenant environment where embodiments of a new identifier allocation approach disclosed herein can be implemented.

FIG. 5 depicts a diagrammatic representation of an example of a multi-tenant environment 500 where embodiments disclosed herein can be implemented. In this example, a docbase 520 stores a sequence table and tenant information table as described above. Each of ORMs 502, 504, 506 always connects with a content server 510 for a specific tenant (e.g., T1, T2, etc.) and requests a chunk of 10 IDs for that tenant. Content server 510 allocates the requested chunk of 10 IDs from the connected tenant's specific cache. When all the IDs in the tenant cache are allocated, content server 510 requests the next set of 1024 IDs from docbase for the tenant, stores the chunk of 1024 IDs for the tenant in the tenant-specific cache, and updates all the necessary fields in the sequence table and the tenant subscription information table.

Figure 6:
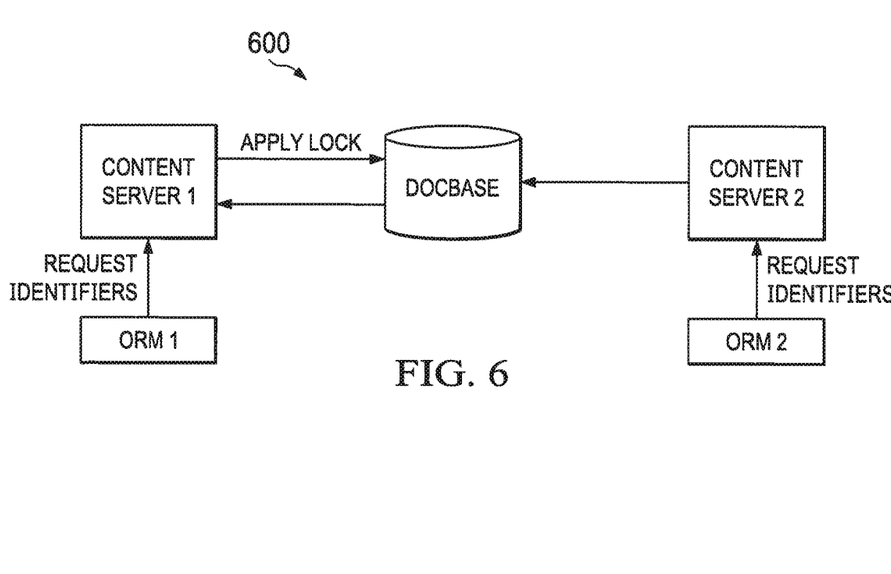
FIG. 6 depicts an example of multi-server operation in which some embodiments of a new identifier allocation approach disclosed herein can be implemented.

The new identifier allocation approach described above can additionally be used to improve a multi-server operation. As illustrated in FIG. 6, suppose there are two content servers on the same repository and two ORM programs request for IDs in parallel, one of the content servers ("content server 1") will apply lock on repo and requests for IDs. Once the request is served, the lock is released and another content server ("content server 2") will process the request for IDs by a connected ORM ("ORM 2").

With the new identifier allocation approach, since there is a difference in a particular part of the enhanced identifier structure, the docbase ID+1 can be stored in a server configuration file for content server 1 and the docbase ID+2 can be stored in a server configuration file for content server 2. By doing so, neither content server needs to apply any lock on the docbase and both the requests can be served in parallel.

Figure 7:
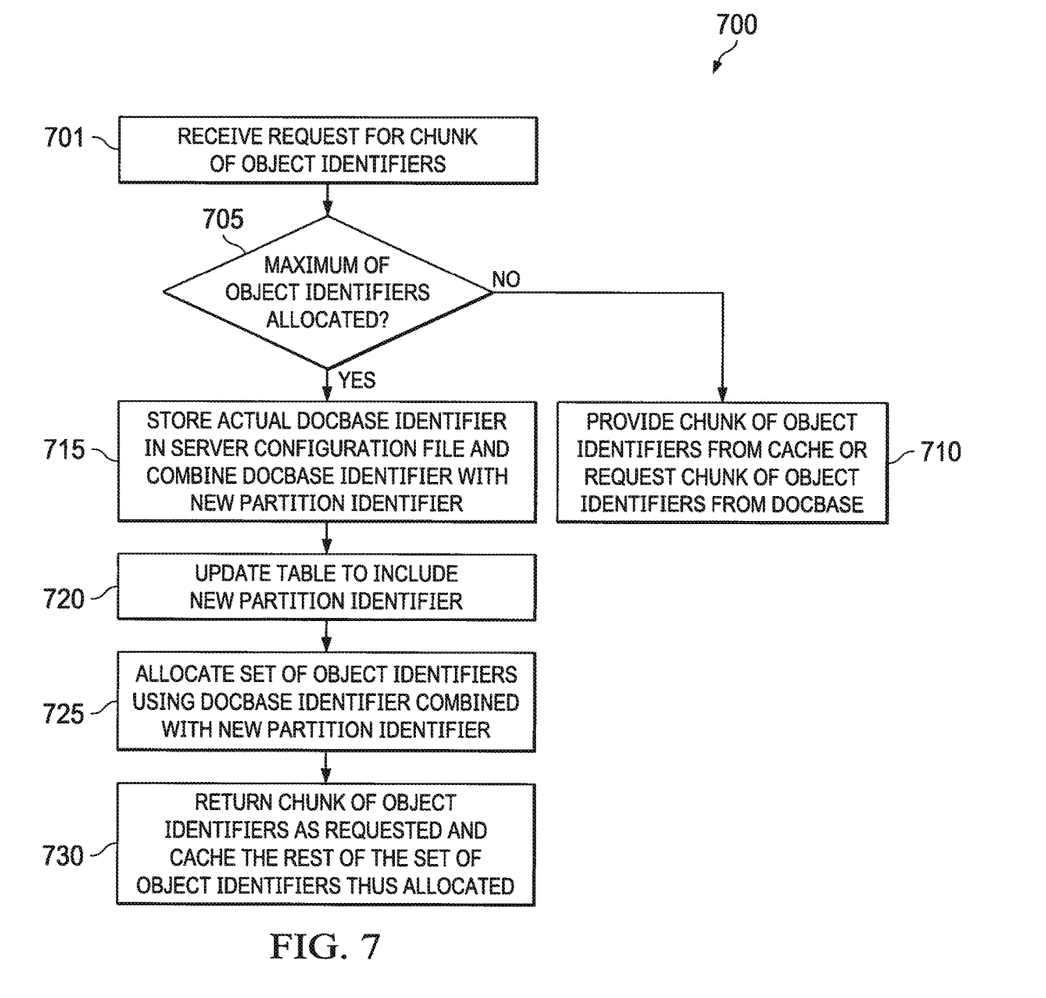
FIG. 7 is a flow chart illustrating an example of a method for scaling beyond the maximum number of unique repository object identifiers previously allowed in a repository.

Therefore, as generally exemplified in FIG. 7, according to some embodiments, method 700 for scaling beyond the maximum number of unique repository object identifiers previously allowed in a repository can include receiving, by a content server, a request for a chunk of repository object identifiers (701). The content server is adapted to determine whether a maximum number of repository object identifiers has been allocated (705). If the maximum number of repository object identifiers has not been allocated, the content server either returns a chunk of repository object identifiers (e.g., 10 repository object identifiers) from its cache or requests a set of repository object identifiers (e.g., 1024 repository object identifiers) from the docbase (710).

Responsive to a determination that the maximum number of repository object identifiers has been allocated, the content server stores the actual docbase identifier in a server configuration file and creates a new docbase identifier by modifying the actual docbase identifier with a new partition identifier (715). As discussed above, this modification can be accomplished by combining the docbase identifier with a new partition identifier (e.g., adding a 1-bit or 2-bit partition identifier to the last bit of a 6-bit docbase identifier, which forms the second part of a 16-bit identifier structure employed by a sequence generator to generate unique repository object identifiers).

A sequence table is correspondingly updated (e.g., by adding an entry of the new partition identifier) (720). In some embodiments, the sequence table resides in the docbase and stores attributes used by a sequence generator to generate and assign repository object identifiers. In some embodiments, the attributes include a current value of allocated identifiers, a low watermark below which is not possible to allocate identifiers, and a high watermark beyond which is not possible to allocate identifiers. The values of these attributes can vary from implementation to implementation.

In some embodiments, the docbase identifier combined with the partition identifier is used to allocate a set of new repository object identifiers (e.g., 1024 repository object identifiers from the docbase) (725). The content server returns a chunk of repository object identifiers as requested (e.g., 10 repository object identifiers) and caches the rest of the set of repository object identifiers thus allocated from the docbase (730). The number of new repository object identifiers per allocation (generation) can vary from implementation to implementation.

Since the first part of the identifier structure dedicated to the object type (which is specified in the request) is not modified, all the repository object identifiers allocated using the docbase identifier combined with the partition identifier has the same object type as the previously allocated repository object identifiers of the same object type. However, repository object identifiers in the newly allocated set will have a modified docbase identifier embedded with a partition number. Since the content server keeps the actual docbase identifier in its server configuration file, it can determine to which partition an object belongs by subtracting the actual docbase identifier stored in the server configuration file from the second part of the repository object identifier dedicated to the docbase identifier, as explained above.

With the ability to create new partitions, more than 4 billion repository objects (e.g., 4,294,967,295) per tag (i.e., per object type) can be addressed uniquely within a docbase, allowing the allocation or generation of repository object identifiers to scale beyond the maximum unique repository object identifiers previously allowed, per object type, in a repository. This new approach is very unique and flexible in accommodating both on premises and multi-tenant environments.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein.

The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a central processing unit ("CPU"), a read-only memory (ROM), a random access memory (RAM), a hard drive (HD), and input/output (I/O) device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc.

Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
   receiving, by a content server which is communicatively connected to a secure enterprise content management repository (a docbase), a request for a chunk of repository object identifiers, each of the repository object identifiers having an identifier structure that infers at least the docbase identifier and a unique object identifier;
   determining, by the content server, whether a maximum number of repository object identifiers has been allocated, the maximum number comprising a number of unique values that can be represented by a number of bits of the object identifiers in the docbase;
   responsive to a determination by the content server that the maximum number of repository object identifiers for the docbase has been allocated,
      storing, by the content server, a docbase identifier in a server configuration file,
      generating, by the content server, a partition identifier,
      combining, by the content server, the docbase identifier with the partition identifier,
      updating, by the content server, a sequence table in the docbase with an entry storing the docbase identifier combined with the partition identifier, wherein the sequence table stores attributes used by a sequence generator to generate and assign repository object identifiers and wherein the attributes include a current value of allocated identifiers, a low watermark below which is not possible to allocate identifiers, and a high watermark beyond which is not possible to allocate identifiers, and
      allocating, by the content server, at least the chunk of new repository object identifiers using the entry of the sequence table storing the docbase identifier combined with the partition identifier; and
   returning the chunk of new repository object identifiers as requested.

2. The method according to claim 1, wherein the request specifies an object type and wherein the chunk of new repository object identifiers is tagged with the object type.

3. The method according to claim 2, further comprising:
   allocating a set of repository object identifiers for the object type using the docbase identifier combined with the partition identifier; and
   storing a difference between the chunk of the new repository object identifiers and the set of repository object identifiers for the object type in a server cache.

4. The method according to claim 1, wherein the repository object identifier comprises a 16-bit hexadecimal representation, wherein the 16-bit hexadecimal representation has the identifier structure, and wherein the identifier structure infers an object type tag, the docbase identifier, and the unique object identifier.

5. The method according to claim 1, wherein the request is received from an object-relational-mapper for a tenant communicatively connected to the content server.

6. The method according to claim 1, wherein the maximum number is 4,294,967,295.

7. A system, comprising:
   a processor;
   a non-transitory computer-readable medium; and
   stored instructions translatable by the processor to perform:
      receiving, by a content server which is running on the processor, a request for a chunk of repository object identifiers, each of the repository object identifiers having an identifier structure that infers at least a docbase identifier of a secure enterprise content management repository (a docbase) and a unique object identifier;
      determining whether a maximum number of repository object identifiers has been allocated, the maximum number comprising a number of unique values that can be represented by a number of bits of the object identifiers in the docbase;
      responsive to a determination that the maximum number of repository object identifiers for the docbase has been allocated, the content server storing the docbase identifier in a server configuration file for a content server, generating a partition identifier, combining the docbase identifier with the partition identifier, updating a sequence table in the docbase with an entry storing the docbase identifier combined with the partition identifier, wherein the sequence table stores attributes used by a sequence generator to generate and assign repository object identifiers and wherein the attributes include a current value of allocated identifiers, a low watermark below which is not possible to allocate identifiers, and a high watermark beyond which is not possible to allocate identifiers, and allocating at least the chunk of new repository object identifiers using the entry of the sequence table storing the docbase identifier combined with the partition identifier; and
      returning the chunk of new repository object identifiers as requested.

8. The system of claim 7, wherein the request specifies an object type and wherein the chunk of new repository object identifiers is tagged with the object type.

9. The system of claim 8, wherein the stored instructions are further translatable by the processor to perform:
allocating a set of repository object identifiers for the object type using the docbase identifier combined with the partition identifier; and
storing a difference between the chunk of the new repository object identifiers and the set of repository object identifiers for the object type in a server cache.

10. The system of claim 7, wherein the repository object identifier comprises a 16-bit hexadecimal representation, wherein the 16-bit hexadecimal representation has the identifier structure, and wherein the identifier structure infers an object type tag, the docbase identifier, and the unique object identifier.

11. The system of claim 7, wherein the request is received from an object-relational-mapper for a tenant communicatively connected to the content server.

12. The system of claim 7, wherein the maximum number is 4,294,967,295.

13. A computer program product comprising a non-transitory computer-readable medium storing instructions translatable by a processor to perform:
receiving a request for a chunk of repository object identifiers;
determining whether a maximum number of repository object identifiers has been allocated;
responsive to a determination that the maximum number of repository object identifiers for the docbase has been allocated, the content server storing the docbase identifier in a server configuration file for a content server, generating a partition identifier, combining the docbase identifier with the partition identifier, updating a sequence table in the docbase with an entry storing the docbase identifier combined with the partition identifier, wherein the sequence table stores attributes used by a sequence generator to generate and assign repository object identifiers and wherein the attributes include a current value of allocated identifiers, a low watermark below which is not possible to allocate identifiers, and a high watermark beyond which is not possible to allocate identifiers, and allocating at least the chunk of new repository object identifiers using the entry of the sequence table storing the docbase identifier combined with the partition identifier; and
returning the chunk of new repository object identifiers as requested.

14. The computer program product of claim 13, wherein the request specifies an object type and wherein the chunk of new repository object identifiers is tagged with the object type.

15. The computer program product of claim 14, wherein the instructions are further translatable by the processor to perform:
allocating a set of repository object identifiers for the object type using the docbase identifier combined with the partition identifier; and
storing a difference between the chunk of the new repository object identifiers and the set of repository object identifiers for the object type in a server cache.

16. The computer program product of claim 13, wherein the repository object identifier comprises a 16-bit hexadecimal representation, wherein the 16-bit hexadecimal representation has the identifier structure, and wherein the identifier structure infers an object type tag, the docbase identifier, and the unique object identifier.

* * * * *